United States Patent
Chen et al.

(10) Patent No.: US 10,547,536 B2
(45) Date of Patent: Jan. 28, 2020

(54) IDENTIFYING SHORTEST PATHS

(71) Applicant: ENTIT Software LLC, Sunnyvale, CA (US)

(72) Inventors: Qiming Chen, Sunnyvale, CA (US); Rui Liu, Sunnyvale, CA (US); Meichun Hsu, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/750,630

(22) PCT Filed: Aug. 7, 2015

(86) PCT No.: PCT/US2015/044345
§ 371 (c)(1),
(2) Date: Feb. 6, 2018

(87) PCT Pub. No.: WO2017/026999
PCT Pub. Date: Feb. 16, 2017

(65) Prior Publication Data
US 2019/0020573 A1    Jan. 17, 2019

(51) Int. Cl.
*H04L 12/733* (2013.01)
*H04L 12/721* (2013.01)
(Continued)

(52) U.S. Cl.
CPC ............ *H04L 45/122* (2013.01); *H04L 45/02* (2013.01); *H04L 45/123* (2013.01); *H04L 45/14* (2013.01); *H04L 45/54* (2013.01); *H04L 45/745* (2013.01)

(58) Field of Classification Search
CPC ..... H04L 45/122; H04L 45/02; H04L 45/745; H04L 45/54; H04L 45/123; H04L 45/14; H04L 45/12
See application file for complete search history.

(56) References Cited

U.S. PATENT DOCUMENTS 6,301,244 B1    10/2001    Huang et al.
6,704,320 B1 *  3/2004    Narvaez ............... H04L 45/02
                                                370/408
(Continued)

FOREIGN PATENT DOCUMENTS

JP    2008211656       9/2008
KR    102015007937     7/2015
WO    WO-2014101176 A1 7/2014

OTHER PUBLICATIONS

Fan, J., et al., The Case Against Specialized Graph Analytics Engines, 7th Biennial Conference on Innovative Data Systems Research, Jan. 4-7, 2015, 10 pages.
(Continued)

*Primary Examiner* — Ivan O Latorre (57) ABSTRACT

Examples relate to identifying shortest paths. In one example, a computing device may: access an edge table that specifies, for each edge of a graph, an edge source, an edge destination, and an edge distance value; access a current path table that specifies paths between nodes of the graph and, for each path, a source node, a destination node, a distance, and a node path; identify each path included in the current path table as a shortest known path; and for each path having a destination node that matches an edge source node, add a new path to the current path table, the new path specifying: the source node as a new source; the edge destination as a new destination; a sum of the edge value and the path distance as a new distance; and the edge destination appended to the node path as a new node path.

16 Claims, 4 Drawing Sheets

(51) Int. Cl.
*H04L 12/751* (2013.01)
*H04L 12/741* (2013.01)

(56) References Cited

U.S. PATENT DOCUMENTS

| | | | |
|---|---|---|---|
| 7,644,052 B1* | 1/2010 | Chang | G06N 5/022 706/45 |
| 8,521,724 B2 | 8/2013 | Tretjakov et al. | |
| 8,631,094 B1* | 1/2014 | Alpert | G06F 16/9024 709/219 |
| 9,846,223 B1* | 12/2017 | Hellwig | G01S 7/38 |
| 2002/0067720 A1* | 6/2002 | Garcia-Luna-Aceves | H04L 45/122 370/389 |
| 2009/0040931 A1 | 2/2009 | Bast et al. | |
| 2010/0150024 A1* | 6/2010 | Juttner | H04L 45/02 370/254 |
| 2012/0016582 A1 | 1/2012 | Cerecke et al. | |
| 2012/0254153 A1 | 10/2012 | Abraham et al. | |
| 2014/0180952 A1* | 6/2014 | Arunapuram | G06Q 10/08355 705/330 |
| 2015/0109934 A1* | 4/2015 | Harshavardha | H04L 45/125 370/238 |
| 2016/0315847 A1* | 10/2016 | Zhang | H04L 12/6418 |
| 2016/0380892 A1* | 12/2016 | Mahadevan | H04L 45/02 370/389 |
| 2019/0215266 A1* | 7/2019 | Filsfils | H04L 45/507 |

OTHER PUBLICATIONS

International Searching Authority., International Search Report and Written Opinion dated Jun. 17, 2016 for PCT Application No. PCT/US2015/044345 Filed Aug. 7, 2015, 11 pages.

Malewicz, G., et al., Pregel: a System for Large-scale Graph Processing, SIGMOD'10, Jun. 6-11, 2010, pp. 135-145.

* cited by examiner

IDENTIFYING SHORTEST PATHS

BACKGROUND

Shortest path problems may be used to represent a variety of situations, often represented in the form of a graph. For example, navigating from one city to another in the shortest time may require determining which roads to take and/or which cities to pass through along the way. Finding solutions to shortest path problem may be computationally expensive, and the necessary computing resources to solve these types of problems often scales rapidly with more complicated graphs.

BRIEF DESCRIPTION OF THE DRAWINGS

The following detailed description references the drawings, wherein.

DETAILED DESCRIPTION

The ability to identify the shortest paths between and for multiple points in a graph has many problem-solving applications in a variety of contexts, such as geographic navigation, network traffic routing and load balancing, and social network analysis, to name a few. Using a database implemented method to find shortest path solutions for multiple sources in a graph may be performed in a manner designed to be path-centric, rather than node-centric. The path-centric approach may be designed for, among other things, producing both the shortest distance and path between nodes, avoiding node state storage, and selectively iterating by identifying active and inactive paths.

For example, the shortest path solution for multiple nodes may begin with an edge table specifying information about the edges of the graph. Data included in the edge table may depend upon the type of graph, e.g., directed, undirected, symmetric, acyclic, and/or multi-graphs. An edge table for a directed graph, by way of example, may specify the source node, destination node, and value for each edge of a graph.

A path table may be generated using known graph information and/or using the edge table. The path table may begin with a path for each node to itself. Using the example of a directed graph, each node of the graph may be associated with a single path from the node and to the node, e.g., with a distance of 0.

To identify the shortest paths of the graph, several actions may be taken to iteratively build paths between the nodes of the graph. For example, in the first iteration using the above example, each active path—e.g., newly added paths or paths added in the previous iteration—having a destination that matches a source node of an edge in the edge table will cause a new path to be added to the path table. The new path specifies the source of the active path as its source and the destination of the edge as the destination. The value of the edge may be added to the distance of the original active path to get the distance for the new path. Adding the destination node a path variable, e.g., concatenating a character or string representing the destination to a character string, allows the path variable to identify each node in the path from the path origin to the path destination.

In situations where multiple paths exist between two nodes, the shortest path may be kept, and other paths may be discarded. Flagging each new and updated path as active is designed to ensure that the process for identifying shortest paths continues until no active paths are remaining. Subsequent updating of graph values may result in re-activating one or more of the paths, e.g., in order to recalculate the shortest paths. Further detail and examples relating to the identification of shortest paths are provided in the paragraphs that follow.

Figure 1:
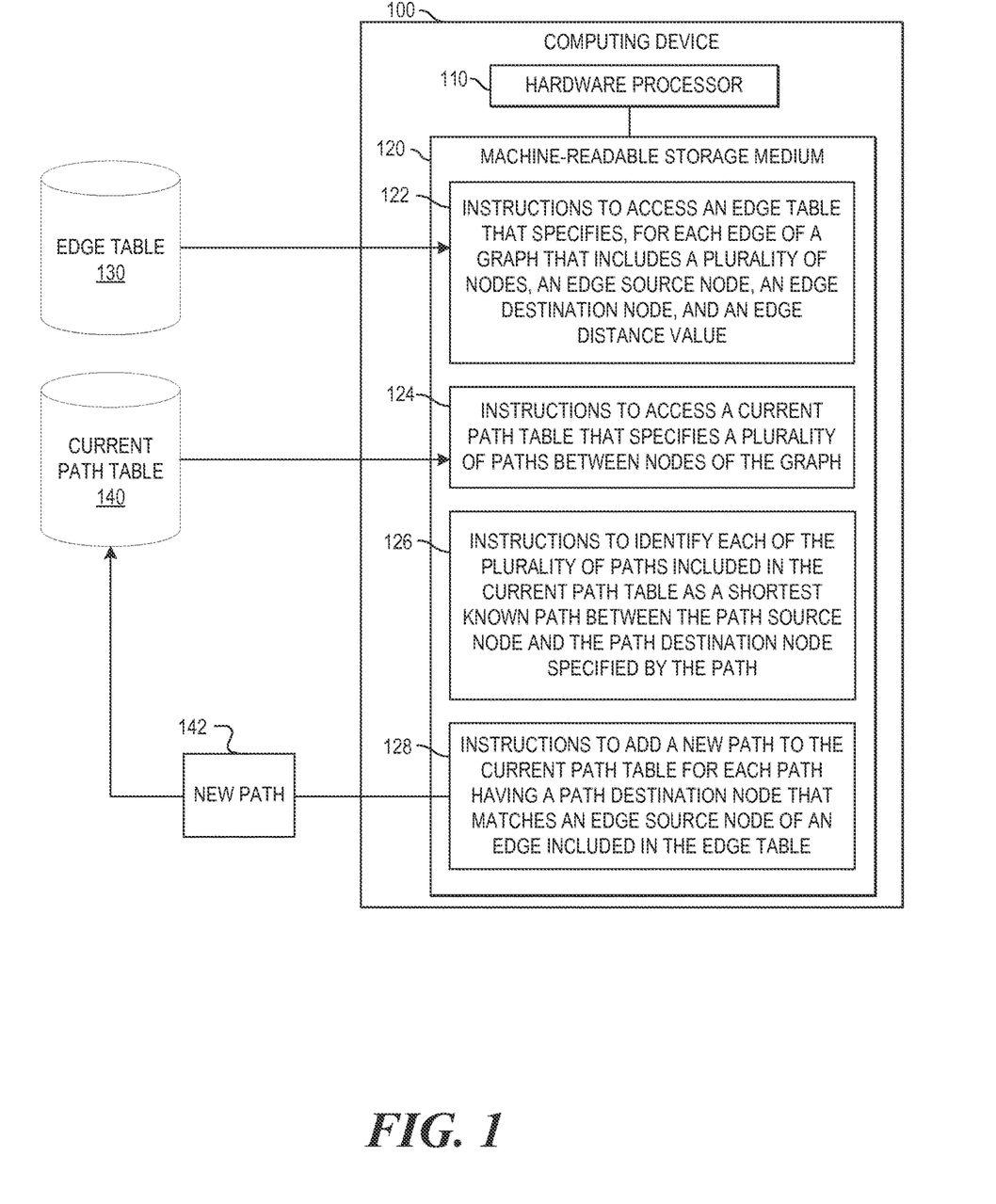
FIG. 1 is a block diagram of an example computing device for identifying shortest paths.

Referring now to the drawings, FIG. 1 is a block diagram of an example computing device 100 for identifying shortest paths. Computing device 100 may be, for example, a server computer, a personal computer, a mobile computing device, or any other electronic device suitable for processing data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-128, to control the process for identifying shortest paths. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for identifying shortest paths.

By way of example, table 1 depicts example database instructions in SQL for identifying the shortest paths of a graph having edges represented in an "edge" table and initial paths represented in a "sp_tmp" table. The instructions may be performed multiple times, e.g., with table "sp" being iteratively updated to include the shortest known paths between nodes.

TABLE 1

```
create table sp as
    select r1.* from
        (select orig, dest, val, path, 1 as mark from sp_tmp
    UNION
        select t.orig,
            e.to_node as dest,
            (t.val + e.val) as val,
            concat(concat(t.path, e.to_node),'|') as path,
            0 as mark
            from edge e, sp_tmp t
            where t.dest = e.from_node and t.mark = 0
        ) r1,
        (select orig, dest, MIN(val) as val from
            (select orig, dest, val from sp_tmp
    UNION
```

TABLE 1-continued

```
        select t.orig as orig,
            e.to__node as dest,
            (t.val + e.val) as val
            from edge e, sp__tmp t
            where t.dest = e.from__node and t.mark = 0) r2
        group by orig. dest
        ) r2
    where r1.orig = r2.orig and r1.dest = r2.dest and r1.val = r2.val;
drop table sp__tmp;
alter table sp rename to sp__tmp;
```

As another example, table 2 depicts a different set of database instructions in SQL for identifying the shortest paths of a graph having edges represented in an "edge" table and initial paths represented in a "sp_tmp" table.

TABLE 2

```
drop table if exists sp__tmp2;
create table sp__tmp2 as
    select orig, dest, val, path, 1 as mark from sp__tmp
    UNION
    Select orig,
        e.to__node as dest,
        (t.val + e.val) as val,
        concat(concat(t.path, e.to__node),'|') as path,
        0 as mark
        from edge e, sp__tmp t where t.dest = e.from__node and
t.mark = 0; create table sp as
    select r1.* from
        sp__tmp2 r1,
        (select orig, dest, MIN(val) as val from sp__tmp2 group by orig,
            dest)
        r2
        where r1.orig = r2.orig and r1.dest = r2.dest and r1.val = r2.val;
drop table sp__tmp;
alter table sp rename to sp__tmp;
select * from sp__tmp;
```

As shown in FIG. 1, the computing device 100 executes instructions to access an edge table 130 that specifies, for each edge of a graph that includes a plurality of nodes, an edge source node, an edge destination node, and an edge distance value (122). For example, a directed edge may specify a first node as its source node, a second node as its destination node, and a value representing a distance. Edge distance may represent a variety of value types, e.g., depending on context. For example, in a geographic navigation context, the distance may represent a physical distance or travel time between physical locations. In a network configuration context, the distance may represent bandwidth, speed, and/or latency between network devices. The edge table 130 is depicted as being stored in a separate data storage device; however, in some implementations, the edge table 130 may be included in the machine readable storage medium 120 of the computing device 100. The edge table 130 may be created by the computing device 100 and/or a separate computing device.

The computing device 100 executes instructions to access a current path table 140 that specifies paths between nodes of the graph (124). The current path table may also specify, for each path, a path source node, a path destination node, a path distance from the path source node to the path destination node, and a node path specifying each node included in the path between the path source node and the path destination node. For example, an initial path table may be initialized with one path for each node to itself, e.g., one path may specify a source of node "A," a destination of node "A," a distance of 0, and a node path of "A."

The computing device executes instructions to identify each of the paths included in the current path table as a shortest known path between the path source node and path destination node specified by the path (126). For example, each path may have a corresponding flag that, when set, indicates that the path is new or recently updated. Paths that are not new or recently updated may be considered inactive, or the shortest known path for the path's source and destination node. Active, or unknown, paths are paths which may still be updated in a future iteration, and using a flag provides an indication of which paths are still a work in progress, e.g., active/unknown paths may be, but are not necessarily, the shortest known path.

The computing device 100 executes instructions to add a new path 142 to the current path table for each path having a path destination node that matches an edge source node of an edge included in the edge table (128). Using the example path above, node A to itself, a new path may be created for each edge that specifies node A as a source node. For example, if the edge table includes a first edge from node A to node B, and a second edge from node A to node C, two new edges may be added to the current path table 140.

When new paths are added to the current path table 140, the original path source node is also the source node of the new path. In the above example, each new path source node would be node A. The new path destination node is the edge destination node. In the above example, the new path for the first edge would specify node B as the destination while the new path for the second edge would specify node C as the destination. The new path distance will be the sum of the edge value and the original path distance. In the example situation, because the original path distance—from node A to itself—is zero, each new path distance will be equal to the edge distance of the edge used to create the new path. The node path for each new node will be the node path of the original path, e.g., A, with the edge destination node appended, e.g., "AB" for the node path of the new path created using the first edge and "AC" for the node path of the new path created using the second edge. In implementations where flags are used to indicate active/unknown, and inactive/shortest known paths, each new path may be flagged as active/unknown.

In some implementations, the computing device 100 identifies the shortest path among matching paths included in the current path table 140. Matching paths may be determined based on a match in both the source and destination nodes, and the shortest path is determined based on the path distance specified by each matching path. By way of example, a first path "AB" may match a second path "ACB," e.g., because the source node (A) and destination node (B) match. In this example, the shortest path may be identified based on the path distance. Each matching path that is not the shortest path may be removed from the current path table 140. For example, in a situation where the path distance of the first path is 10 and the path distance of the second path is 8, the first path may be discarded from the current path table 140.

In some implementations, multiple iterations of the instructions 122-128 may be used to build a full shortest path table, e.g., a current path table 140 with no active paths. For example, the computing device 100 may determine, based on at least one active path being included in the current path table 140, that additional paths may exist. In response to the determination, the computing device 100 may, for example, identify each unknown or active path as an inactive or shortest known path and, for each previously unknown path having a path destination node that matches an edge source node of an edge included in the edge table, add a second new path to the current path table 140.

Using the example above, the flag for the path "ACB" may be set to indicate that it is the shortest known path from node A to node B. New paths may be created for each edge having node B as a source node. In a situation where node B has one edge to node C, a new path "ACBC" may be created by appending node C to the original node path. The new path source node will remain node A, the new path's destination node will be node C, and the distance may be the sum of the distance associated with path "ACB" and the distance associated with the edge from node B to node C. In implementations where flags are used, a flag may be set to indicate path "ACBC" is an active path.

As before, the computing device 100 may determine, among matching paths included in the current path table 140, which is the shortest, discarding the rest. In the above example, the path "AC" and path "ACBC" may match. In situations where distance values are non-negative, path "AC" will always be shorter than path "ACBC," and the path "ACBC" may be discarded, e.g., as the path "AC" is shorter.

The computing device 100 may determine, in response to determining that no paths included in the current path table 140 are identified as an unknown, or active, path, that the current path table 140 specifies each shortest known path between each node of the graph. By flagging each path as inactive prior to identifying new paths, the process to determine shortest paths may end when all new paths, e.g., the only paths marked as active, are discarded.

While specific examples are provided for the implementations provided above, the identification of the shortest paths for nodes of a graph may be implemented in other ways. For example, new tables may be created and discarded for each iteration, and/or the entries in existing tables may be modified throughout each iteration. Entries may be created, deleted, and/or modified to perform equivalent operations. For example, in some implementations, a new current path table 140 may be created for each iteration, and existing paths may be copied and modified to create new paths. An additional example graph and shortest path identification method is described with respect to FIGS. 2A and 2B, below.

Figure 2A:
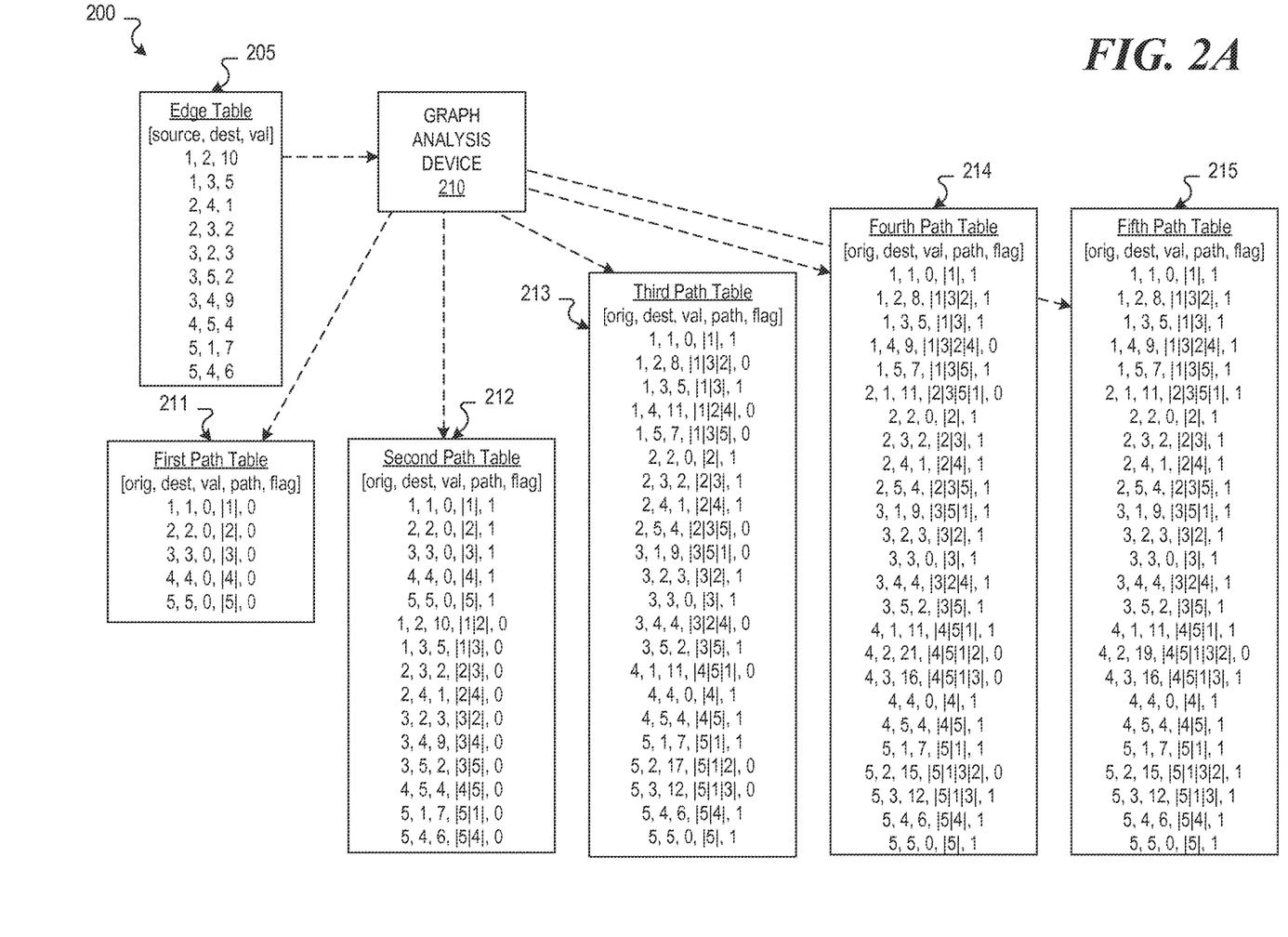
FIG. 2A is an example data flow for identifying shortest paths.
Figure 2B:
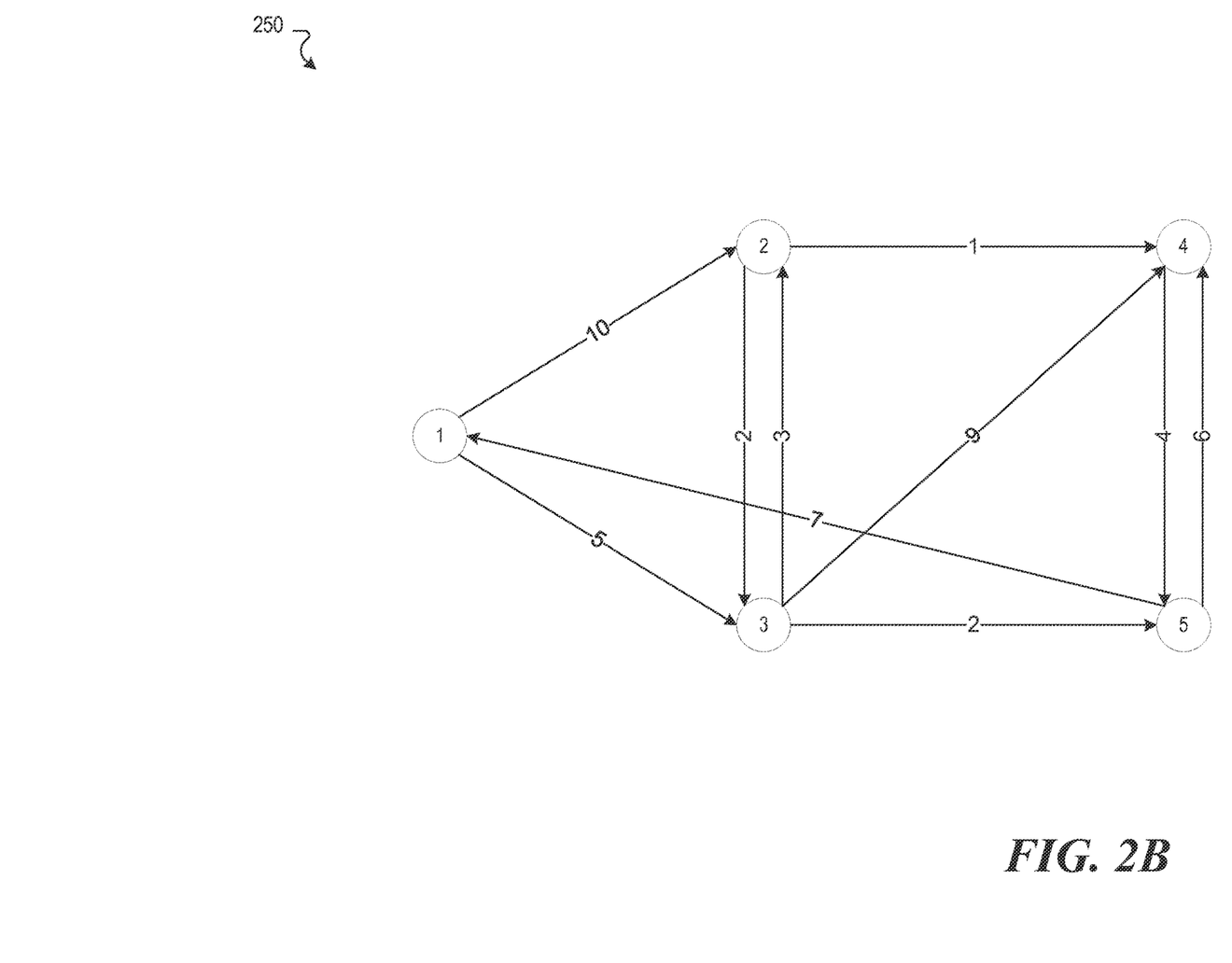
FIG. 2B is a representation of an example graph for identifying shortest paths.

FIG. 2A is an example data flow 200 for identifying shortest paths, and FIG. 2B is a representation of an example graph 250. The data flow 200 depicts a graph analysis device 210, which may be implemented by a computing device, such as the computing device 100 described above with respect to FIG. 1. The graph 250 is a directed graph which may represent a variety of things. For example, the nodes 1-5 may each represent a geographic location, while the edges between the nodes may represent direction and travel time between nodes. For example, the edge from node 1 to node 2 may indicate a 10 minute travel time from node 1 to node 2 along that edge.

The edge table 205, reproduced as Table 3 below, specifies, for each edge of the graph 250, an edge source, destination, and distance value. In some implementations, the graph analysis device 210 may create the edge table 205.

TABLE 3

| Edge Source | Edge Destination | Edge Value |
|---|---|---|
| 1 | 2 | 10 |
| 1 | 3 | 5 |
| 2 | 4 | 1 |
| 2 | 3 | 2 |

TABLE 3-continued

| Edge Source | Edge Destination | Edge Value |
|---|---|---|
| 3 | 2 | 3 |
| 3 | 5 | 2 |
| 3 | 4 | 9 |
| 4 | 5 | 4 |
| 5 | 1 | 7 |
| 5 | 4 | 6 |

The graph analysis device 210 creates the first path table 211 which specifies, for each node of the graph, an original path from each node to itself, with a path value of 0. The first path table 211 is reproduced as Table 4, below.

TABLE 4

| Path Origin | Path Destination | Path Distance | Node Path | Active Flag |
|---|---|---|---|---|
| 1 | 1 | 0 | \|1\| | 0 |
| 2 | 2 | 0 | \|2\| | 0 |
| 3 | 3 | 0 | \|3\| | 0 |
| 4 | 4 | 0 | \|4\| | 0 |
| 5 | 5 | 0 | \|5\| | 0 |

In this implementation, a binary value for an active flag is used to indicate whether a path is active or inactive, with 0 indicating active and 1 indicating inactive. In the initial table, each of the original paths are flagged as active.

The graph analysis device 210 may add a new path to the first path table for each path having a path destination node that matches an edge source node. When multiple edge source nodes match a path destination node, a new path may be added for each matching edge. Each new path added to the table specifies the path source node as the new path source node, the edge destination node as the new path destination, and a sum of the edge value and the path distance as the new path distance, and the edge destination node appended to the node path as the new node path. For any paths that match source and destination with another path, only the path with the smallest path distance, may be kept.

As shown in the example data flow 200, the second path table 212, reproduced as Table 5 below, for the graph 250 shows the shortest paths after a first iteration. The table below is grouped by path origin and destination and, in this example, each of the original paths have been flagged as inactive, e.g., prior to the creation of the new paths.

TABLE 5

| Path Origin | Path Destination | Path Distance | Node Path | Active Flag |
|---|---|---|---|---|
| 1 | 1 | 0 | \|1\| | 1 |
| 1 | 2 | 10 | \|1\|2\| | 0 |
| 1 | 3 | 5 | \|1\|3\| | 0 |
| 2 | 2 | 0 | \|2\| | 1 |
| 2 | 3 | 2 | \|2\|3\| | 0 |
| 2 | 4 | 1 | \|2\|4\| | 0 |
| 3 | 2 | 3 | \|3\|2\| | 0 |
| 3 | 3 | 0 | \|3\| | 1 |
| 3 | 4 | 9 | \|3\|4\| | 0 |
| 3 | 5 | 2 | \|3\|5\| | 0 |
| 4 | 4 | 0 | \|4\| | 1 |
| 4 | 5 | 4 | \|4\|5\| | 0 |
| 5 | 1 | 7 | \|5\|1\| | 0 |
| 5 | 4 | 6 | \|5\|4\| | 0 |
| 5 | 5 | 0 | \|5\| | 1 |

As the graph analysis device 210 continues processing, each active path is flagged as inactive when new paths are being added. In some implementations, new paths are added for each path that was active, e.g., for each path that was added or updated in the immediately preceding iteration. For example, each path that was flagged as active in the second path table will have a new path added for each edge that specifies the active path as a source node. By way of example, Table 6 represents a snapshot of the path table after new paths are added, but before matching paths are removed.

TABLE 6

| Path Origin | Path Destination | Path Distance | Node Path | Active Flag |
|---|---|---|---|---|
| 1 | 1 | 0 | \|1\| | 1 |
| 1 | 2 | 10 | \|1\|2\| | 1 |
| 1 | 2 | 8 | \|1\|3\|2\| | 0 |
| 1 | 3 | 5 | \|1\|3\| | 1 |
| 1 | 3 | 12 | \|1\|2\|3\| | 0 |
| 1 | 4 | 11 | \|1\|2\|4\| | 0 |
| 1 | 4 | 14 | \|1\|3\|4\| | 0 |
| 1 | 5 | 7 | \|1\|3\|5\| | 0 |
| 2 | 2 | 0 | \|2\| | 1 |
| 2 | 2 | 5 | \|2\|3\|2\| | 0 |
| 2 | 3 | 2 | \|2\|3\| | 1 |
| 2 | 4 | 1 | \|2\|4\| | 1 |
| 2 | 4 | 11 | \|2\|3\|4\| | 0 |
| 2 | 5 | 5 | \|2\|4\|5\| | 0 |
| 2 | 5 | 4 | \|2\|3\|5\| | 0 |
| 3 | 1 | 9 | \|3\|5\|1\| | 0 |
| 3 | 2 | 3 | \|3\|2\| | 1 |
| 3 | 3 | 0 | \|3\| | 1 |
| 3 | 3 | 5 | \|3\|2\|3\| | 0 |
| 3 | 4 | 4 | \|3\|2\|4\| | 0 |
| 3 | 4 | 8 | \|3\|5\|4\| | 0 |
| 3 | 4 | 9 | \|3\|4\| | 1 |
| 3 | 5 | 2 | \|3\|5\| | 1 |
| 3 | 5 | 13 | \|3\|4\|5\| | 0 |
| 4 | 1 | 11 | \|4\|5\|1\| | 0 |
| 4 | 4 | 0 | \|4\| | 1 |
| 4 | 4 | 10 | \|4\|5\|4\| | 0 |
| 4 | 5 | 4 | \|4\|5\| | 1 |
| 5 | 1 | 7 | \|5\|1\| | 1 |
| 5 | 2 | 17 | \|5\|1\|2\| | 0 |
| 5 | 3 | 12 | \|5\|1\|3\| | 0 |
| 5 | 4 | 6 | \|5\|4\| | 1 |
| 5 | 5 | 0 | \|5\| | 1 |
| 5 | 5 | 10 | \|5\|4\|5\| | 0 |

For paths that match one another, e.g., paths with the same origin and destination in Table 6, the graph analysis device 210 may identify the shortest path based on the path distances, and discard each other matching path. For example, there are three matching paths from node 3 to node 4. Path |3|2|4| is the shortest path, with a distance of 4. Accordingly, path |3|5|4| and path |3|4| are discarded, as they are not the shortest path from node 3 to node 4. The third path table 213, reproduced as Table 7 below, includes the shortest paths after matching paths have been discarded for the third iteration.

TABLE 7

| Path Origin | Path Destination | Path Distance | Node Path | Active Flag |
|---|---|---|---|---|
| 1 | 1 | 0 | \|1\| | 1 |
| 1 | 2 | 8 | \|1\|3\|2\| | 0 |
| 1 | 3 | 5 | \|1\|3\| | 1 |
| 1 | 4 | 11 | \|1\|2\|4\| | 0 |
| 1 | 5 | 7 | \|1\|3\|5\| | 0 |
| 2 | 2 | 0 | \|2\| | 1 |

TABLE 7-continued

| Path Origin | Path Destination | Path Distance | Node Path | Active Flag |
|---|---|---|---|---|
| 2 | 3 | 2 | \|2\|3\| | 1 |
| 2 | 4 | 1 | \|2\|4\| | 1 |
| 2 | 5 | 4 | \|2\|3\|5\| | 0 |
| 3 | 1 | 9 | \|3\|5\|1\| | 0 |
| 3 | 2 | 3 | \|3\|2\| | 1 |
| 3 | 3 | 0 | \|3\| | 1 |
| 3 | 4 | 4 | \|3\|2\|4\| | 0 |
| 3 | 5 | 2 | \|3\|5\| | 1 |
| 4 | 1 | 11 | \|4\|5\|1\| | 0 |
| 4 | 4 | 0 | \|4\| | 1 |
| 4 | 5 | 4 | \|4\|5\| | 1 |
| 5 | 1 | 7 | \|5\|1\| | 1 |
| 5 | 2 | 17 | \|5\|1\|2\| | 0 |
| 5 | 3 | 12 | \|5\|1\|3\| | 0 |
| 5 | 4 | 6 | \|5\|4\| | 1 |
| 5 | 5 | 0 | \|5\| | 1 |

After the next iteration, the graph analysis device 210 produces the fourth path table 214, reproduced as Table 8 below.

TABLE 8

| Path Origin | Path Destination | Path Distance | Node Path | Active Flag |
|---|---|---|---|---|
| 1 | 1 | 0 | \|1\| | 1 |
| 1 | 2 | 8 | \|1\|3\|2\| | 1 |
| 1 | 3 | 5 | \|1\|3\| | 1 |
| 1 | 4 | 9 | \|1\|3\|2\|4\| | 0 |
| 1 | 5 | 7 | \|1\|3\|5\| | 1 |
| 2 | 1 | 11 | \|2\|3\|5\|1\| | 0 |
| 2 | 2 | 0 | \|2\| | 1 |
| 2 | 3 | 2 | \|2\|3\| | 1 |
| 2 | 4 | 1 | \|2\|4\| | 1 |
| 2 | 5 | 4 | \|2\|3\|5\| | 1 |
| 3 | 1 | 9 | \|3\|5\|1\| | 1 |
| 3 | 2 | 3 | \|3\|2\| | 1 |
| 3 | 3 | 0 | \|3\| | 1 |
| 3 | 4 | 4 | \|3\|2\|4\| | 1 |
| 3 | 5 | 2 | \|3\|5\| | 1 |
| 4 | 1 | 11 | \|4\|5\|1\| | 1 |
| 4 | 2 | 21 | \|4\|5\|1\|2\| | 0 |
| 4 | 3 | 16 | \|4\|5\|1\|3\| | 0 |
| 4 | 4 | 0 | \|4\| | 1 |
| 4 | 5 | 4 | \|4\|5\| | 1 |
| 5 | 1 | 7 | \|5\|1\| | 1 |
| 5 | 2 | 15 | \|5\|1\|3\|2\| | 0 |
| 5 | 3 | 12 | \|5\|1\|3\| | 1 |
| 5 | 4 | 6 | \|5\|4\| | 1 |
| 5 | 5 | 0 | \|5\| | 1 |

At this point, every node has a path to each other node in the graph, and only five active paths remain. As with previous iterations, the next iteration will add new paths for each of the active paths having edges that match the active path's destination node. After adding the new paths and removing duplicates, the graph analysis device produces the fifth path table 215, reproduced as Table 9 below.

TABLE 9

| Path Origin | Path Destination | Path Distance | Node Path | Active Flag |
|---|---|---|---|---|
| 1 | 1 | 0 | \|1\| | 1 |
| 1 | 2 | 8 | \|1\|3\|2\| | 1 |
| 1 | 3 | 5 | \|1\|3\| | 1 |
| 1 | 4 | 9 | \|1\|3\|2\|4\| | 1 |
| 1 | 5 | 7 | \|1\|3\|5\| | 1 |
| 2 | 1 | 11 | \|2\|3\|5\|1\| | 1 |
| 2 | 2 | 0 | \|2\| | 1 |

TABLE 9-continued

| Path Origin | Path Destination | Path Distance | Node Path | Active Flag |
|---|---|---|---|---|
| 2 | 3 | 2 | \|2\|3\| | 1 |
| 2 | 4 | 1 | \|2\|4\| | 1 |
| 2 | 5 | 4 | \|2\|3\|5\| | 1 |
| 3 | 1 | 9 | \|3\|5\|1\| | 1 |
| 3 | 2 | 3 | \|3\|2\| | 1 |
| 3 | 3 | 0 | \|3\| | 1 |
| 3 | 4 | 4 | \|3\|2\|4\| | 1 |
| 3 | 5 | 2 | \|3\|5\| | 1 |
| 4 | 1 | 11 | \|4\|5\|1\| | 1 |
| 4 | 2 | 19 | \|4\|5\|1\|3\|2\| | 0 |
| 4 | 3 | 16 | \|4\|5\|1\|3\| | 1 |
| 4 | 4 | 0 | \|4\| | 1 |
| 4 | 5 | 4 | \|4\|5\| | 1 |
| 5 | 1 | 7 | \|5\|1\| | 1 |
| 5 | 2 | 15 | \|5\|1\|3\|2\| | 1 |
| 5 | 3 | 12 | \|5\|1\|3\| | 1 |
| 5 | 4 | 6 | \|5\|4\| | 1 |
| 5 | 5 | 0 | \|5\| | 1 |

At this point, only one active path remains. Intuitively, another iteration is not necessary, because the remaining active path has already traversed every node of the graph. In this situation, another iteration of adding new paths would result in the new paths being discarded and all paths being marked as inactive. This example implementation completes the identification of the shortest paths for the example graph 250. Table 9, for example, indicates the shortest path from each node of the graph to each other node and, in addition, the distance of each shortest path.

While the description of the example graph 250 and data flow 200 provide the shortest path for a directed graph, as indicated above, the described method may also be used for identifying shortest paths of other graph types. For example, a multi-graph that may have multiple edges between pairs of nodes, the identification of shortest paths would proceed as described above, and an identifier specifying which edge is used may be added to each path. In addition, in some implementations, the "shortest" path problem solved by the shortest path identification process may, depending on the type of values used, be a largest or longest path. In a situation where the shortest path problem is applied to a computing network searching for the most available bandwidth between devices of the network, larger bandwidth values are selected as "shorter" path values, e.g., the "shortest" path between two nodes, in this example, will be the path with the largest bandwidth.

While the example data flow 200 depicts a single graph analysis device 210 identifying the shortest paths for the graph 250, other device configurations may be used. For example, tables may be stored in separate computing and/or storage devices, and multiple computing devices may be used to perform the operations being performed by the graph analysis device 210.

Figure 3:
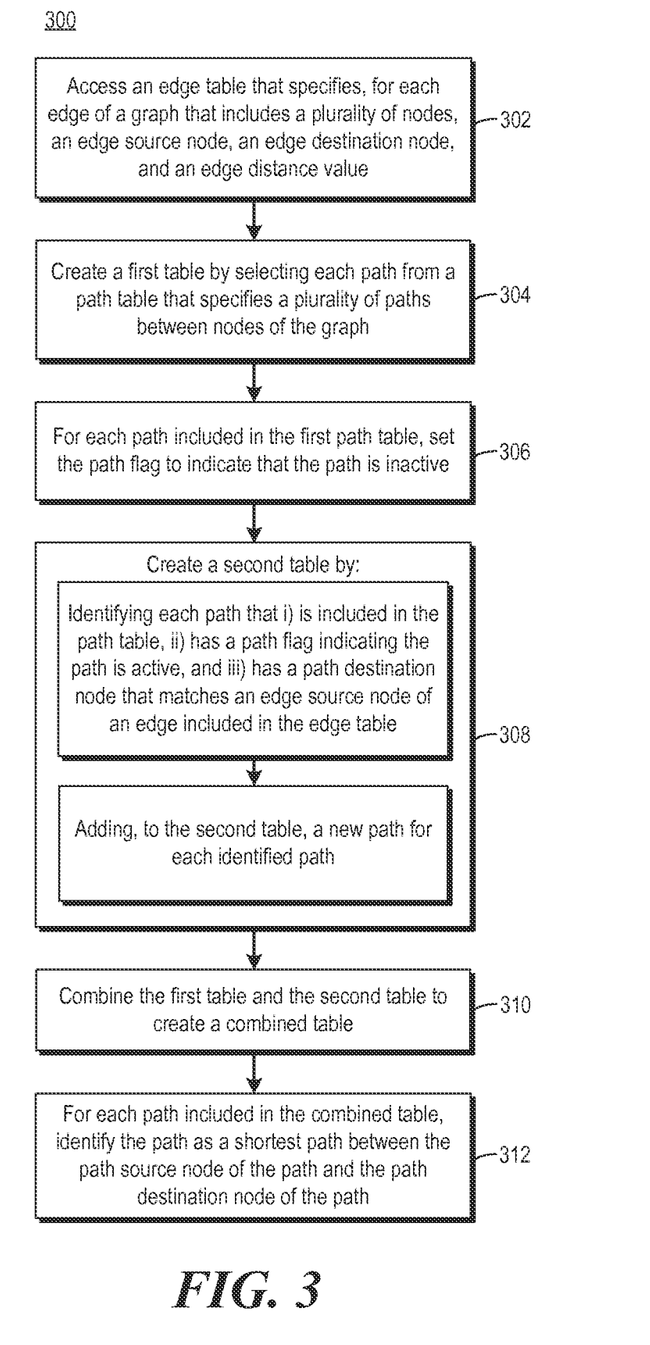
FIG. 3 is a flowchart of an example method for identifying shortest paths.

FIG. 3 is a flowchart of an example method 300 for identifying shortest paths. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry.

An edge table is accessed that specifies, for each edge of a graph that includes multiple nodes, an edge source node, an edge destination node, and an edge distance value (302). For example, a graph may represent a content delivery network, where each node of the graph represents a server device, each edge represents a connection between server devices, and each edge value represents the latency between server devices.

A first table is created by selecting each path from a path table that specifies multiple paths between nodes of the graph (304). Each path specifies a path source node, a path destination node, a path distance from the path source node to the path destination node, a node path specifying each node included in the path between the path source node and the path destination node, and a path flag indicating whether the path is active. For example, the path table may initially have one path for each server device to itself, and 0 latency, or some other base latency value, for the path distance.

For each path included in the first path table, the path flag is set to indicate that the path is inactive (306). This is designed, for example, to ensure that these paths are not considered active if they remain the shortest path after identifying other matching paths.

A second table is created (308). To create the second table, each path is identified that i) is included in the path table, ii) has a path flag indicating the path is active, and iii) has a path destination node that matches an edge source node of an edge included in the edge table. For each identified path, a new path is added to the second table. For example, in the first iteration, the path flag for each original path, from each server to itself, is active in the path table, which results in new paths being added for each connection between each server device represented in the graph.

Each new path specifies the path source node of the identified path as a new path source node, the edge destination node of the identified path as a new path destination node, a sum of the edge value and the path distance of the identified path as a new path distance, and the edge destination node appended to the node path of the identified path as a new node path. By way of example, a server device A has an active path to itself, and an edge to server device B with a latency value of 5. A new path may specify A as the source, B as the destination, 5 (0+5) as the path latency, "AB" as the node path, and a path flag set to indicate the path is active.

The first table and second table are combined to create a combined table (310). In the example above, the combined table contains each original path set to inactive and each new path set to active.

For each path included in the combined table, identify the path as a shortest path between the path source node of the path and the path destination node of the path (312). The identification may be in response to determining that the path distance of the path specifies a smaller value than a path distance of each other path included in the combined table that specifies a same path source node and same path destination node as the path. Using the content delivery network example, in a situation where there are two different paths from server A to server C, the path with the lowest latency may be kept as the shortest path while the other path is discarded. A tie, if one exists, may be handled in a variety of ways. For example, the currently inactive path may be kept, all paths that tie may be kept, or the path(s) with the shortest number of nodes in the node path may be kept.

In some implementations, a determination may be made that the combined table specifies the shortest paths between nodes of the graph in response to determining that each path flag of each path included in the combined table indicates that the path is inactive. For example, after a certain number of iterations, no new paths may be kept, and this indicates that the shortest path identification process is complete.

The foregoing disclosure describes a number of example implementations for identifying shortest paths. As detailed above, examples provide a mechanism for identifying the shortest paths from multiple sources to multiple destinations of various types of graphs and potential applications of a system that is capable of identifying shortest paths.

We claim:

1. A non-transitory machine-readable storage medium storing instructions executable by a hardware processor of a computing device for identifying shortest paths, wherein the instructions, when executed, cause the hardware processor to:

access an edge table that specifies, for each edge of a graph that includes a plurality of nodes, an edge source node, an edge destination node, and an edge distance value indicating a distance between the edge source node and the edge destination node;

create a current path table from the nodes of the graph, wherein the current path table specifies a plurality of paths between the nodes of the graph and, for each path, a path source node, a path destination node, a path distance from the path source node to the path destination node, and a node path specifying each node included in the path between the path source node and the path destination node;

for each path in the current path table that has a path destination node that matches an edge source node of an edge included in the edge table, add a new path to the current path table, wherein the new path added to the current path table specifies: a sum of the edge distance value of the edge and the path distance of the path as a new path distance;

determine matching paths in the current path table that have a same path source node and a same path destination node;

identify a shortest path among the matching paths in the current path table, wherein the shortest path among the matching paths is a path that has a smallest path distance; and remove, from the current path table, each matching path that is not the shortest path.

2. The non-transitory machine-readable storage medium of claim 1, wherein the new path added to the current path table further specifies:

the path source node of the path as a new path source node;

the edge destination node as a new path destination node; and the edge destination node appended to the node path as a new node path.

3. The non-transitory machine-readable storage medium of claim 1, wherein the instructions further cause the hardware processor to:

determine, in response to determining that no paths included in the current path table are identified as an unknown path, that the current path table specifies each shortest known path between the nodes in the graph.

4. The non-transitory machine-readable storage medium of claim 1, wherein the instructions further cause the hardware processor to:

determine that at least one path included in the current path table is identified as an unknown path, and in response to the determination:

identify each unknown path as a shortest known path; and for each unknown path having a path destination node that matches an edge source node of an edge included in the edge table, add a second new path to the current path table, the second new path specifying:

the path source node as a second new path source node;

the edge destination node as a second new path destination node;

a sum of the edge value and the path distance as a second new path distance; and the edge destination node appended to the node path as a second new node path.

5. The non-transitory machine-readable storage medium of claim 4, wherein the instructions further cause the hardware processor to:

remove, from the current path table, matching second new paths that are not a shortest path, where the matching second new paths have a same path source node and a same path destination node.

6. The non-transitory machine-readable storage medium of claim 5, wherein the instructions further cause the hardware processor to:

determine, in response to determining that no paths included in the current path table are identified as an unknown path, that the current path table specifies each shortest known path between the nodes in the graph.

7. The non-transitory machine-readable storage medium of claim 1, wherein:

the current path table includes one starting path for each of the nodes in the graph, a path source node of the starting path matching a path destination node of the starting path.

8. A computing device for identifying shortest paths, the computing device comprising:

a hardware processor; and a data storage device storing instructions that, when executed by the hardware processor, cause the hardware processor to:

access an edge table that specifies, for each edge of a graph that includes a plurality of nodes, an edge source node, an edge destination node, and an edge distance value indicating a distance between the edge source node and the edge destination node;

create an original path table that specifies, for each node of the graph, an original path that specifies the node as a path source node, the node as a path destination node, a path distance of zero from the path source node to the path destination node, and a node path specifying the node;

add each original path from the original path table to a current path table;

for each path in the current path table that has a path destination node that matches an edge source node of an edge included in the edge table, add a new path to the current path table, wherein the new path added to the current path table specifies: a sum of the edge distance value of the edge and the path distance of the path as a new path distance;

determine matching paths in the current path table that have a same path source node and a same path destination node;

identify a shortest path among the matching paths in the current path table, the shortest path being a path that has a smallest path distance; and remove, from the current path table, each matching path that is not the shortest path.

9. The computing device of claim 8, wherein:

each original path is flagged as an inactive path;

each new path is flagged as an active path; and
wherein the instructions further cause the hardware processor to:
create a second current path table that includes each original path of the original path table and each new path, wherein each original path and each new path is flagged as an inactive path in the second current path table; and
for each path that i) is flagged as an active path in the second current path table, and ii) has a path destination node that matches an edge source node of an edge included in the edge table, add a second new path to the second current path table, the second new path specifying:
the path source node of the path as a second new path source node;
the edge destination node of the path as a second new path destination node;
a sum of the edge value and the path distance as a second new path distance; and
the edge destination node appended to the node path as a second new node path.

10. The computing device of claim 9, wherein the instructions further cause the hardware processor to:
identify, from the second current path table, paths that match one another based on matching path source nodes and matching path destination nodes;
for paths that match one another, identify a shortest path, the shortest path being identified based on path distances specified by each matching path; and
discard each matching path that is not the shortest path.

11. The computing device of claim 10, wherein:
each new path in the second current path table is flagged as an inactive path;
each second new path in the second current path table is flagged as an active path; and
wherein the instructions further cause the hardware processor to:
determine, in response to determining that no paths included in the second current path table are identified as an unknown path, that the second current path table specifies each shortest known path between the nodes in the graph.

12. The computing device of claim 8, wherein the new path added to the current path table, further specifies:
the path source node of the path as a new path source node;
the edge destination node of the path as a new path destination node; and
the edge destination node appended to the node path as a new node path.

13. A method for identifying shortest paths, implemented by a hardware processor, the method comprising:
accessing an edge table that specifies, for each edge of a graph that includes a plurality of nodes, an edge source node, an edge destination node, and an edge distance value indicating a distance between the edge source node and the edge destination node;
creating a first path table by selecting each path from a path table that specifies a plurality of paths between the plurality of nodes of the graph and, for each path, a path source node, a path destination node, a path distance from the path source node to the path destination node, a node path specifying each node included in the path between the path source node and the path destination node, and a path flag indicating whether the path is active;
for each path included in the first path table, setting the path flag to indicate that the path is inactive;
creating a second path table by:
identifying each path that i) is included in the first path table, ii) has a path flag indicating the path is active, and iii) has a path destination node that matches an edge source node of an edge included in the edge table; and
for each identified path, adding, to the second path table, a new path specifying:
the path source node of the as a new path source node;
the edge destination node of the edge as a new path destination node;
a sum of the edge value of the edge and the path distance of the identified path as a new path distance; and
the edge destination node appended to the node path of the identified path as a new node path;
combining the first path table and the second path table to create a combined path table;
determining matching paths in the combined path table that have a same path source node and a same path destination node; and
identifying a shortest path among the matching paths in the combined path table, the shortest path being a path that has a smallest path distance from the path source node to the path destination node.

14. The method of claim 13, wherein the first path table specifies one starting path for each of the plurality of nodes of the graph, a path source node of the starting path matching a path destination node of the starting path.

15. The method of claim 13, further comprising:
discarding, from the combined path table, each matching path that is not identified as the shortest path.

16. The method of claim 14, further comprising:
determining that each path flag of each path included in the combined path table indicates that the path is inactive; and
in response to the determination, determining that the combined path table is a shortest path table specifying the shortest paths between the plurality of nodes of the graph.

* * * * *